United States Patent
Goverdhan et al.

(10) Patent No.: US 10,027,491 B2
(45) Date of Patent: Jul. 17, 2018

(54) CERTIFICATE DISTRIBUTION USING DERIVED CREDENTIALS

(71) Applicant: AirWatch LLC, Atlanta, GA (US)

(72) Inventors: Urvashi Goverdhan, Bangalore (IN); Sagar Date, Atlanta, GA (US); Kiran Rohankar, Atlanta, GA (US); Gaurav Halbe, Atlanta, GA (US); Sridhara Babu Kommireddy, Alpharetta, GA (US); Daniel Quintas, Atlanta, GA (US)

(73) Assignee: AIRWATCH LLC, Atlanta, GA (US)

( * ) Notice: Subject to any disclaimer, the term of this patent is extended or adjusted under 35 U.S.C. 154(b) by 169 days.

(21) Appl. No.: 15/084,944

(22) Filed: Mar. 30, 2016

(65) Prior Publication Data

US 2017/0288883 A1 Oct. 5, 2017

(51) Int. Cl.
| | |
|---|---|
| *H04L 9/32* | (2006.01) |
| *H04L 9/00* | (2006.01) |
| *G06F 17/30* | (2006.01) |
| *H04L 9/30* | (2006.01) |
| *H04L 29/06* | (2006.01) |

(52) U.S. Cl.
CPC ...... *H04L 9/3271* (2013.01); *G06F 17/30589* (2013.01); *G06F 17/30595* (2013.01); *G06F 17/30607* (2013.01); *H04L 9/006* (2013.01); *H04L 9/30* (2013.01); *H04L 9/3226* (2013.01); *H04L 9/3242* (2013.01); *H04L 63/0428* (2013.01); *H04L 63/083* (2013.01); *H04L 63/0876* (2013.01)

(58) Field of Classification Search
None
See application file for complete search history.

(56) References Cited

U.S. PATENT DOCUMENTS

2004/0268148 A1* 12/2004 Karjala ............... H04L 41/0806
726/15

* cited by examiner

*Primary Examiner* — Brandon S Hoffman
(74) *Attorney, Agent, or Firm* — Thomas Horstemeyer, LLP

(57) ABSTRACT

Disclosed are approaches for distributing credentials using derived credentials, such as by relaying a simple certificate enrollment protocol (SCEP) payload. A computing device configures a device profile corresponding to a client device. The device profile can include a SCEP payload. The computing device later receives an override for the SCEP payload from a broker service. In response, the computing device creates a copy of the device profile that includes the override for the SCEP payload. The computing device then sends the copy of the device profile to the client device.

20 Claims, 3 Drawing Sheets

CERTIFICATE DISTRIBUTION USING DERIVED CREDENTIALS

BACKGROUND

Enterprise users often require the use of cryptographic certificates to access enterprise resources. For example, users may require a certificate to verify their identities when logging onto or otherwise accessing a particular service. As another example, users may require a certificate to encrypt network communications between their client devices and enterprise services. These certificates are often provided by a certificate authority (CA), which can be managed by the enterprise.

A management agent provided by a third party, such as a enterprise mobility management (EMM) agent installed on a client device, can request certificates from the CA. For example, the EMM software can make a request using the simple certificate enrollment protocol (SCEP). This SCEP request can include credentials provided by a user to the EMM software to authenticate a user device with the CA. In response, the CA can determine that the client device is authorized to receive a certificate and can provide the certificate to the requesting device. However, in these implementations, a user's authentication credentials (e.g., a password) can be leaked to the third-party by virtue of the user having to provide their authentication credentials to the EMM software to receive a certificate from the CA.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are examples for distributing certificates using derived credentials. Enterprise networks can include one or more certificate servers that issue certificates to client devices for access to network resources. In some cases, access to the certificate servers is provided through an intermediary public key infrastructure (PKI) broker. The PKI broker can be a secure server operated by the enterprise or by a trusted party. However, other management features, such as enterprise mobility management (EMM) services, can be provided by third-party software vendors. The EMM services can, in some cases, require that the certificate servers issue certificates to managed mobile devices. However, the enterprise may not be able to allow the EMM services access to user credentials, such as passwords, due to policy reasons. For example, in a high security environment, policies might prohibit third-party software from having access to user credentials. In addition, the enterprise may prohibit the EMM provider from being able to directly request certificates from the enterprise's CA. As a result, the EMM services can be required to provide separate credentials to the client device that are derived from the user credentials. Moreover, the enterprise may desire to have the certificate authority track which certificates have been issued to particular client devices managed by the EMM services. These problems can be addressed, for example, by providing the third-party EMM services with secondary credentials derived from the user's primary credentials and using, for example, a customizable SCEP profile. This can allow the EMM services to perform their functions without having access to the user's actual credentials or having access to the distribution of a certificate from the CA to a client device.

Figure 1:
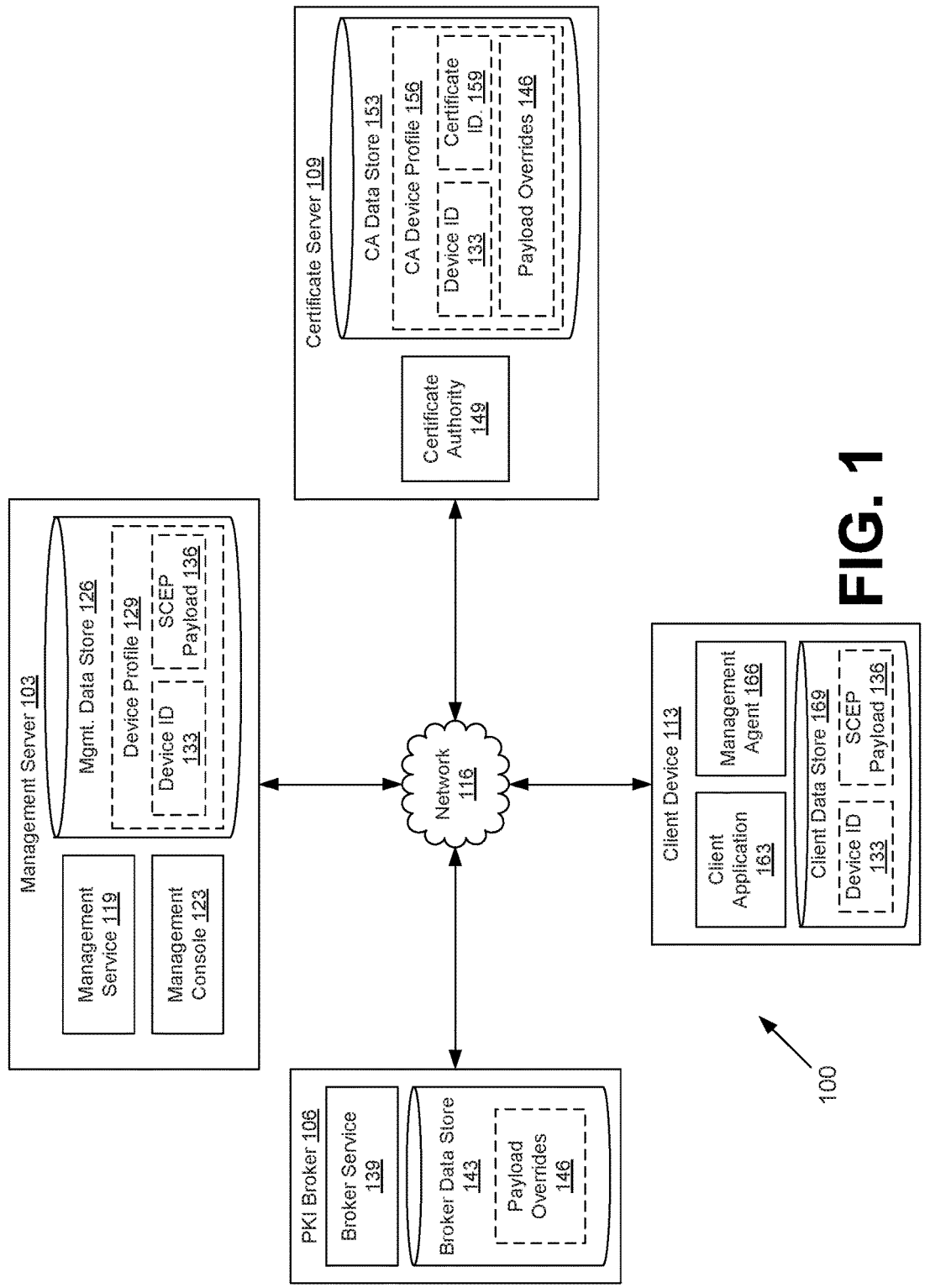
FIG. 1 is a schematic block diagram of a network environment.

FIG. 1 is a schematic block diagram depicting a networked environment 100 according to several examples of the present disclosure. The networked environment 100 includes a management server 103, a public key infrastructure (PKI) broker 106, a certificate server 109, and a client device 113, which are in communication with each other over a network 116. The network 116 can include the Internet, intranets, extranets, wide area networks (WANs), local area networks (LANs), wired networks, wireless networks, or other suitable networks, or any combination of two or more networks. For example, the networks can include satellite networks, cable networks, Ethernet networks, and other types of networks.

The management server 103, a public key infrastructure (PKI) broker 106, and the certificate server 109 can include a server computer or any other system providing computing capability. Alternatively, the management server 103, the public key infrastructure (PKI) broker 106, and the certificate server 109 can employ a plurality of computing devices that can be arranged in one or more server banks, computer banks, or other arrangements. The computing devices can be located in a single installation or can be distributed among many different geographical locations. For example, the management server 103, the public key infrastructure (PKI) broker 106, and the certificate server 109 can include a plurality of computing devices that together include a hosted computing resource, a grid computing resource, or any other distributed computing arrangement. In some cases, the management server 103, the public key infrastructure (PKI) broker 106, and the certificate server 109 can correspond to an elastic computing resource where the allotted capacity of processing, network, storage, or other computing-related resources that vary over time.

Although the management server 103, the public key infrastructure (PKI) broker 106, and the certificate server 109 are depicted as separate computing devices, in some instances one or more of the management server 103, the public key infrastructure (PKI) broker 106, and the certificate server 109 can be merged to operate on a single computing device. For example, the management server 103, the public key infrastructure (PKI) broker 106, and the certificate server 109 can correspond to virtualized servers running as virtual machines executing on a common computing device or hosted in a common computing environment, such as a common data center or server farm.

Applications or other functionality can be executed by the management server 103. The components executed on the management server 103 can include a management service 119 and a management console 123. However, other applications, services, processes, systems, engines, or functionality can be provided by the management server 103.

The management service 119 can administer the operation of client devices 113 registered or otherwise enrolled with the management service 119. To this end, the management service 119 can enforce or otherwise require particular applications to be installed on an enrolled client device 113, require the client device 113 to be configured in a particular manner, or require that particular features be enabled or disabled on the client device 113. To accomplish these ends, the management service 119 can send or otherwise push settings or configuration details to the client device 113.

The management console 123 can provide an administrative interface for configuring the management service 119 and the configuration of client devices 113 that are administered by the management service 119. Accordingly, the management console 123 can correspond to a web page or web application provided by a web server hosted by the management server 103.

The management data store 126 can include one or more relational databases or non-relational databases (e.g., hierarchical databases, key-value databases, object databases, files, or other non-relational databases). The data stored in the management data store 126 is associated with the operation of the applications or functional entities discussed in this application.

The data stored in the management data store 126 includes a device profile 129 and potentially other data. The device profile 129 can represent a client device 113 registered or otherwise enrolled with the management service 119. The device profile 129 can include a device identifier 133, a SCEP payload 136, and other settings.

The device identifier 133 can represent a unique identifier mapping a client device 113 to a device profile 129. Accordingly, the device identifier 133 can correspond to any identifier that uniquely identifies a client device 113 with respect to a plurality of other client devices 113. For example, the device identifier 133 can include a serial number of the client device 113, a media access control (MAC) address of a network interface card (NIC) of the client device 113, or an identification number assigned to the client device 113 by the management service 119.

The SCEP payload 136 can represent information that a client device 113 would need to generate a valid SCEP request for a certificate. The information included in a SCEP payload 136 can include a SCEP challenge, a SCEP end point, and a user account identifier. The SCEP challenge can correspond to a password, authentication token, or other data that a client device 113 making a SCEP request can use to prove that the client device 113 is authorized to receive a certificate. The SCEP end point represents the computing device to which a SCEP request should be sent. In some instances, the SCEP end point can include the certificate server 109. In other instances, the SCEP end point can include the PKI broker 106.

Applications or other functionality can be executed by the PKI broker 106. The components executed on the PKI broker 106 can include a broker service 139. However, other applications, services, processes, systems, engines, or functionality can be provided by the PKI broker 106.

The broker service 139 can be executed to provide a mechanism for a client device 113 to communicate with the certificate server 109. In some instances, the broker service 139 can generate values for data fields that are to be included in a SCEP payload 136. In some instances, the broker service 139 can also provide access to the certificate server 109 for the client device 113. For example, when a client device 113 is located outside of an enterprise network and the certificate server 109 is located inside the enterprise network, the client device 113 could be unable to directly communicate with the certificate server 109. However, in this example, the client device 113 can communicate with the broker service 139, which in turn communicates with the certificate server 109 on behalf of the client device 113. In these configurations, the broker service 139 can act as a secure proxy to allow client devices 113 located outside of the enterprise network to communicate with the certificate server 109 inside the enterprise network.

The broker data store 143 can include one or more relational databases or non-relational databases (e.g., hierarchical databases, key-value databases, object databases, files, or other non-relational databases). The data stored in the broker data store 143 is associated with the operation of the applications or functional entities discussed in this application.

The data stored in the broker data store 143 includes payload overrides 146 and potentially other data. The payload overrides 146 can represent values to be used by a client device 113 for a SCEP payload 136. The payload overrides 146 can include, for example, values for a SCEP challenge, a SCEP endpoint, user specific data (such as subject name, subject alternate name, certificate uses, encryption key uses, and other data specific to a user), and other data fields in the SCEP payload 136. The values of the payload overrides 146 can be generated by the broker service 139, for example, in response to a user account authenticating with the broker service 139 or as a function of initial configuration values.

Applications or other functionality can be executed by the certificate server 109. The components executed on the certificate server 109 can include a certificate authority (CA) 149. However, other applications, services, processes, systems, engines, or functionality can be provided by the certificate server 109.

The CA 149 can be executed to issue and validate cryptographic certificates. For example, the CA 149 can issue cryptographic certificates to client devices 113 in response to a request for a certificate. The CA 149 can also validate the authenticity of certificates that have been issued by the CA 149. For example, a client device 113 might request that the CA 149 validate a certificate issued to a server to confirm the identity of the server before initiating an encrypted connection with the server. Likewise, a server can request that the CA 149 validate a certificate issued to a client device 113 to confirm the identity of the client device 113 before initiating an encrypted connection with the server.

The CA data store 153 can include one or more relational databases or non-relational databases (e.g., hierarchical databases, key-value databases, object databases, files, or other non-relational databases). The data stored in the CA data store 153 is associated with the operation of the applications or functional entities discussed in this application.

The data stored in the CA data store 153 includes a CA device profile 156 and potentially other data. The CA device profile 156 is similar to the device profile 129 in that the CA device profile 156 can represent a client device 113 registered or otherwise enrolled with the management service 119. However, the CA 149 further uses the CA device profile 156 to track which client devices 113 have been issued a certificate. To accomplish this feature, the CA device profile 156 includes a device identifier 133 and payload overrides 146, as previously described. In addition, a CA device profile 156 includes a certificate identifier 159 which identifies a certificate issued to a client device 113.

The client device 113 is representative of one or more client devices 113 that can be coupled to the network 116. The client device 113 can include a processor-based system, such as a computer system. The computer system can include a desktop computer, a laptop computer, a personal digital assistant, a cellular telephone, a smartphone, a set-top box, a music player, a web pad, a tablet computer system, a game console, an electronic book reader, a wearable computing device, an augmented reality or virtual reality device, or another device with like capability. The client device 113 can execute applications, including a client application 163, a management agent 166, and potentially other applications.

The client application 163 can include any locally installed application executable by the client device 113. For example, the client application 163 can include a web browser, email application, virtual private network client, messaging application, a network file access application, a voice-over-internet-protocol (VoIP) application, and potentially other applications. The client application 163 can further be configured to use a certificate issued by the CA 149 to perform its functions. For example, a web browser or VPN client can be configured to use a certificate to authenticate the identity of the client device 113 with a web server or a VPN gateway. As another example, an email application, messaging application, network file access application, or VoIP application can be configured to use a certificate issued by the CA 149 to encrypt data (e.g., encrypt an email, encrypt a chat session, encrypt a file stored on a remote server, or encrypt a voice call).

The management agent 166 can maintain data communication with the management service 119 to perform actions on the client device 113 in response to instructions received from the management service 119. This can include configuring the client application 163 to execute in a particular manner or use particular values for settings. The management agent 166 can also configure other settings of the client device 113 as instructed by the management service 119.

The client data store 169 can include one or more relational databases or non-relational databases (e.g., hierarchical databases, key-value databases, object databases, files, or other non-relational databases). The data stored in the client data store 169 is associated with the operation of the applications or functional entities discussed in this application. The data can include, for example, a copy of the device identifier 133 and the SCEP payload 136, as previously described.

Next, a general description of the operation of the components of the networked environment 100 is provided. The components of the networked environment 100 can be configured to operate in several ways. Several of the potential configurations are detailed in the following discussion.

To begin, the broker service 139 causes the PKI broker 106 to authenticate a user account. For example, a user of the client device 113 can submit a username and password to the PKI broker 106 to be authorized to receive certificates from the certificate server 109. However, other authentication methods are possible.

In some instances, the broker service 139 service causes the PKI broker 106 to generate one or more payload overrides 146. The payload overrides 146 generated can include a SCEP challenge for authenticating a request for a certificate using SCEP and a SCEP endpoint designating where a SCEP request for a certificate should be sent. For example, the SCEP challenge generated by the broker service 139 can be derived from the username or password submitted to authenticate the user.

However, in other instances, the broker service 139 can retrieve the payload overrides 146 from the certificate server 109. For example, the certificate server 109 could have previously generated a SCEP challenge for the user to use to retrieve certificates.

Next, the broker service 139 causes the PKI broker 106 to send the payload overrides 146 to the management server 103. The management service 119 then causes the management server 103 to modify the SCEP payload 136 of a device profile 129 to match the values specified by the payload overrides 146. For example, the management service 119 can cause the management server 103 to change the SCEP challenge of the SCEP payload to a value provided by the PKI broker 106.

Subsequently, the management service 119 causes the management server 103 to push one or more components of the device profile 129 to the client device 113. For example, the management service 119 can cause the management server 103 to send the modified SCEP payload 136 to the client device 113. The management agent 166 then causes the client device 113 to store received components of the device profile 129, such as the modified SCEP payload 136, in the client data store 169.

At some later point, the management agent 166 causes the client device 113 to make a SCEP request to the SCEP endpoint specified in the modified SCEP payload 136. For example, if the SCEP endpoint specified in the modified SCEP payload 136 identifies the PKI broker 106, then the client device 113 will send a SCEP request to the PKI broker 106. The SCEP request can include the SCEP challenge specified in the SCEP payload 136 and potentially other data, such as the device identifier 133 of the client device 113 making the request or the type of certificate requested.

In response to receiving the SCEP request, the broker service 139 causes the PKI broker 106 to request a certificate from the certificate server 109. The request to the certificate server 109 can include the device identifier 133 of the client device 113. The CA 149 then causes the certificate server 109 to generate and issue a certificate for the client device 113. After generating the certificate, the CA 149 causes the certificate server 109 to send the certificate to the PKI broker 106. The CA 149 can also cause the certificate server 109 to record the device identifier 133 of the client device 113 and the certificate identifier 159 of the issued certificate to track which certificates have been issued to which client devices 113.

Finally, the broker service 139 causes the PKI broker 106 to send a SCEP response back to the client device 113. The SCEP response can include the certificate issued by the certificate server 109. The management agent 166 then causes the certificate to be stored on the client device 113 for use by the client application 163.

Figure 2:
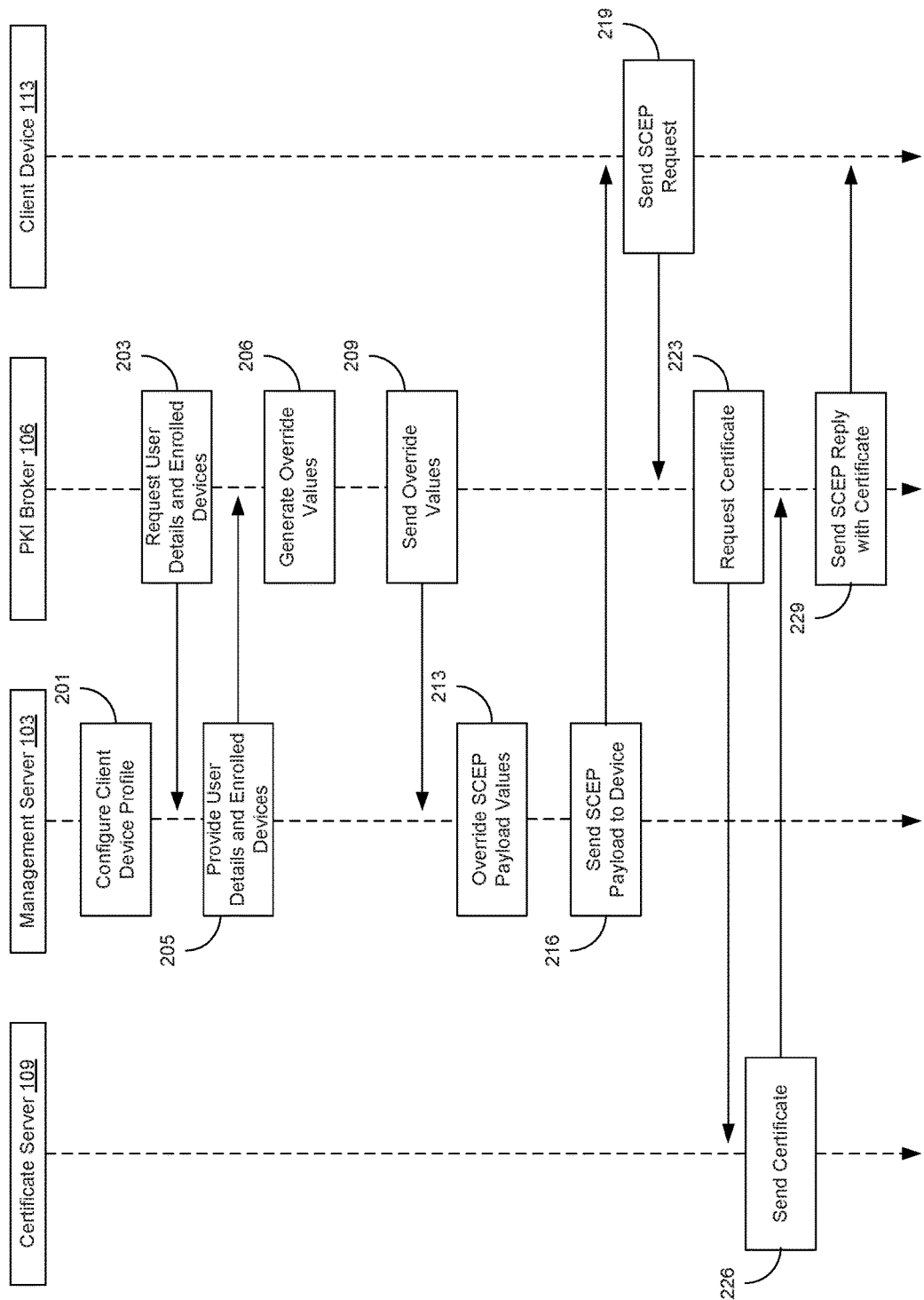
FIG. 2 is a sequence diagram depicting the interaction of components of the network environment.

Referring next to FIG. 2, shown is a sequence diagram that provides one example of the interaction of applications executed by the management server 103, the PKI broker 106, the certificate server 109, and the client device 113.

Beginning with step 201, the management server 103 executes the management service 119 to configure a device profile 129 corresponding to the client device 113. The device profile 129 can be created in response to the client device 113 registering or enrolling with the management service 119. For example, during the enrollment or registration process, the management agent 166 can be installed on the client device 113 and report to the management service 119 device details such as the serial number of MAC address of the client device 113.

The management service 119 can then create the device profile 129 for the client device 113. As part of the creation process, the management service 119 can assign the serial number or MAC address of the client device 113 as the device identifier 133 for the device profile 129. In other instances, the management service 119 can create its own unique device identifier 133, which is stored as part of the device profile 129, and then provide the created device identifier 133 to the management agent 166 to be stored in the client data store 169. The management service 119 can also create a SCEP payload 136 as part of the device profile 129. The SCEP payload 136 can be assigned default values when the device profile 129 is first created. For example, the management service 119 can assign a default SCEP endpoint, such as the certificate server 109, to the SCEP payload 136. Likewise, the management service 119 can assign a default SCEP challenge to the SCEP payload 136.

Moving to step 203, the PKI broker 106 executes the broker service 139 to retrieve a user information and the device profiles 129 for any associated client devices 113 from the management server 103. In some instances, this step may include several substeps. For example, the broker service 139 can first request a list of groups that a user is a member of (e.g., sales, marketing, administration, finance, engineering, etc.), the user's email address or similarly unique identifier, and other user information. In some instances, this step can be manually initiated. After retrieving the user information, the broker service 139 can then request a device profile 129 for each client device 113 enrolled with the management service 119 and linked to the user. For example, the broker service 139 could send a request to the management service 119 requesting all device profiles 129 associated with the email address of the user.

Next at step 205, the management server 103 executes the management service 119 to provide the information requested by the broker service 139. For example, in reply to a request for the user's information, the management service 119 could cause the management server 103 to send a response that includes the user's email address, a list of groups that the user is a member of, and potentially other data. Likewise, in reply to a request for a list of a device profiles 129 associated with or linked to the user's email address, the management service 110 could cause the management server 103 to send a response containing one or more device profiles 129 satisfying the criteria provided by the PKI broker 106.

Proceeding to step 206, the PKI broker 106 executes the broker service 139 to generate one or more payload overrides 146. For example, the broker service 139 can generate a payload override 146 specifying a SCEP challenge to be used when requesting that the certificate server 109 issue a certificate. The payload override 146 can be generated in response to a user authentication with the PKI broker 106.

Authentication can occur in several ways. For instance, the management agent 166 can provide authentication details, such as the device identifier 133 of the client device 113, to the broker service 139. The broker service 139 can then compare the device identifier 133 provided by the management agent 166 with the device identifier 133 tracked by the management service to confirm enrollment. As another example, the user can have provided his or her username and password to the broker service 139, such as the username and password used to logon to an enterprise service or the client device 113 itself, which the broker service 139 can use to verify that the user of the client device 113 is authorized to receive certificates issued by the certificate server 109.

After authentication occurs, the broker service 139 can cause the PKI broker 106 to generate the SCEP challenge. The SCEP challenge can be randomly generated, or it can be derived from a password supplied by a user. For example, the SCEP challenge can be the result of applying a cryptographic hash function, such as the message digest 5 ("md5") function or versions of the secure hash algorithm ("SHA"), to a user supplied password.

However, in some instances, the SCEP challenge could already have been generated by the CA 149. In these instances, the SCEP challenge can be retrieved from the certificate server 109 to be provided to the management service 119. As another example the broker servicer 139 can specify a payload override 146 identifying the SCEP endpoint to be used for a SCEP request for a certificate.

Moving to step 209, the broker service 139 executing on the PKI broker 106 causes the PKI broker 106 to send the payload overrides 146 generated at step 206 to the management server 103. In some instances, the broker service 139 can also cause the PKI broker 106 to provide the payload overrides 146 to the certificate server 109.

Referring next to step 213, the management service 119 executing on the management server 103 causes the management server 103 to modify the SCEP payload 136 of the device profile 129 based at least in part on the payload overrides 146 received from the PKI broker 106. For example, the management service 119 can change the SCEP challenge in the SCEP payload 136 to a value specified in the payload overrides 146 received from the PKI broker 106. As another example, the management service 119 can change the SCEP endpoint in the SCEP payload 136 to a value specified in the payload overrides 146 received from the PKI broker 106. Then proceeding to step 216, the management service 119 causes the management server 103 to send the modified SCEP payload 136 to the client device 113.

Moving to step 219, the management agent 166 executing on the client device 113 causes the client device 113 to send a SCEP request to a SCEP endpoint specified in the SCEP payload 136 received from the management server 103. In the example illustrated here, the client device 113 sends the SCEP request to the PKI broker 106, which corresponds to a SCEP payload 136 that specifies the PKI broker 106 as the SCEP endpoint. However, in other examples, the SCEP endpoint can include the certificate server 109. In these other examples, it is understood that the management agent 166 would instead cause the client device 113 to send the SCEP request directly to the certificate server 109.

Referring next to step 223, the broker service 139 causes the PKI broker 106 to request a certificate from the certificate server 109 on behalf of the client device 113. In some instances, the broker service 139 can cause the PKI broker 106 to generate a second SCEP request containing the data provided in the SCEP request received from the client device 113 and send the second SCEP request to the certificate server 109. In other instances, the broker service 139 can use other protocols for requesting a certificate from the certificate server 109 on behalf of the client device 113.

In some examples, the broker service 139 can authenticate the SCEP request received from the client device 113 prior to requesting the certificate for the client device 113. In these examples, the broker service 139 can compare the SCEP challenge provided by the client device 113 to the SCEP challenge generated previously at step 206. If the SCEP challenge provided by the client device 113 matches the previously generated SCEP challenge, then the broker service 139 can cause the PKI broker 106 to request the certificate.

Proceeding to step 226, the CA 149 causes the certificate server 109 to issue a certificate to the client device 113 and provide the issued certificate to the PKI broker 106. In some instances the CA 149 can cause the certificate server 109 to authenticate the request for the certificate. For example, when the PKI broker 106 sends a second SCEP request to the certificate server 109 or forwards the SCEP request received from the client device 113 to the certificate server 109, the CA 149 can cause the certificate server 109 to first determine whether the SCEP challenge provided by the client device 113 matches SCEP challenge generated previously at step 206. If the SCEP challenge provided by the client device 113 matches the previously generated SCEP challenge, then the CA 149 can cause the certificate server 109 to issue the requested certificate.

After authenticating the certificate request, the CA 149 causes the certificate server 109 to generate the certificate. As part of the generation process, the CA 149 can store the device identifier 133 of the client device 113 requesting the certificate in the CA device profile 156 along with the certificate identifier 159 of the generated certificate. Once the certificate is generated, the CA 149 causes the certificate server 109 to provide the certificate to the PKI broker 106, as illustrated. However, in instances where the client device 113 requests the certificate directly from the certificate server 109, the CA 149 can cause the certificate server 109 to send the generated certificate to the client device 113.

Moving to step 229, the broker service 139 causes the PKI broker 106 to send a SCEP response to the client device 113. The SCEP response can include the certificate issued by the certificate server 109. After the PKI broker 106 sends the SCEP response to the client device 113, the process ends.

Several results are achieved by the previously executed sequence. First, the client device 113 is able to obtain a certificate from the certificate server 109 without having to divulge the password of a user to the management server 103. Instead, the process of obtaining a certificate from the certificate server 109 uses a SCEP challenge that is derived from the user's authentication credentials, such as the user's password. Because the management server 103 can be provided by or controlled by a third party independent from the entity that owns the certificate server 109 and the client device 113, this reduces the number of parties that have to have access to a user's password. Second, the certificate server 109 itself is able to track which client devices 113 have been issued a certificate instead of relying on the management server 103 or the PKI broker 106 to track this data.

Figure 3:
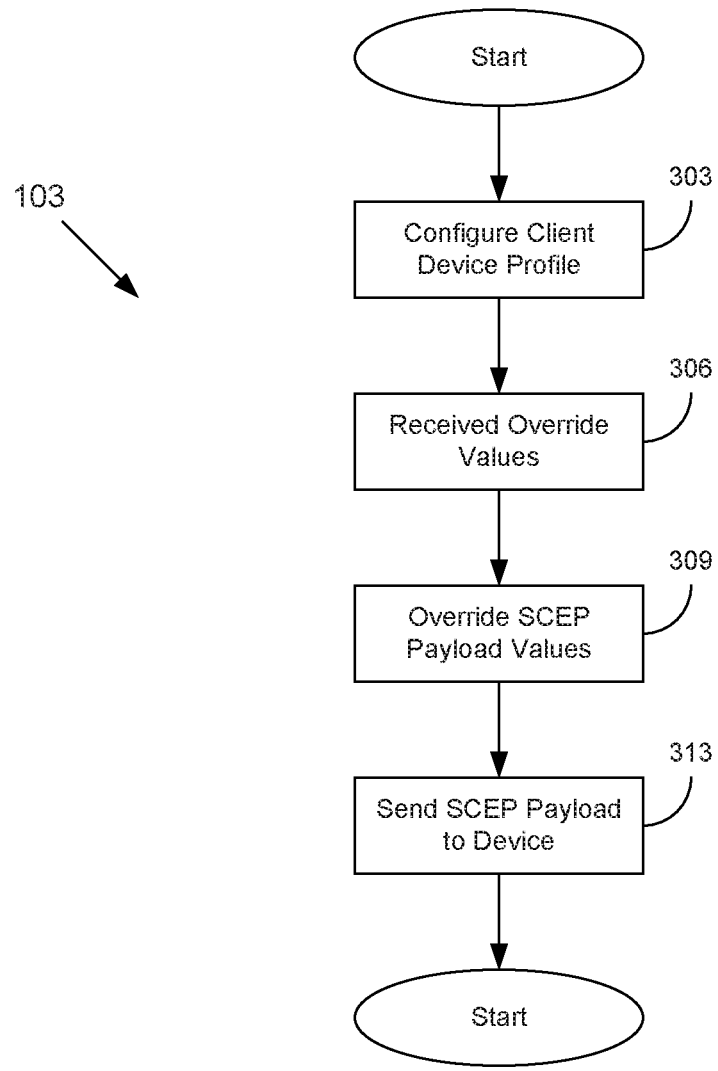
FIG. 3 is a flowchart depicting the functionality provided by one or more components.

FIG. 3 depicts a flowchart illustrating functions performed by the management service 119 executing on the management server 103. Accordingly, the elements depicted in FIG. 3 can represent machine readable instructions stored in the memory of the management server 103 that, when executed by a processor of the management server 103, cause the management server 103 to perform the actions illustrated. The elements depicted in FIG. 3 can also represent a method or process performed by the management server 103.

Beginning with step 303, the management service 119 causes the management server 103 to configure a device profile. As part of the creation process, the management service 119 can assign the serial number or MAC address of the client device 113 as the device identifier 133 for the device profile 129. In other instances, the management service 119 can create its own unique device identifier 133, which is stored as part of the device profile 129, and then provide the created device identifier 133 to the management agent 166 to be stored in the client data store 169. The management service 119 can also create a SCEP payload 136 as part of the device profile 129. The SCEP payload 136 can be assigned default values when the device profile 129 is first created. For example, the management service 119 can assign a default SCEP endpoint, such as the certificate server 109, to the SCEP payload 136. Likewise, the management service 119 can assign a default SCEP challenge to the SCEP payload 136.

Moving on to step 306, the management service 119 causes the management server 103 to receive one or more payload overrides 146 from a PKI broker 106. For example, the management service 119 can cause the management server 103 to repeatedly poll the network 116 for a message from the PKI broker 106 containing the payload overrides 146. This can be accomplished, for example, by creating a socket configured to listen for network traffic on a specific port that corresponds to communications from the broker service 139 executing on the PKI broker 106.

Proceeding to step 309, the management service 119 causes the management server 103 to modify the SCEP payload 136 of the device profile 129 based at least in part on the payload overrides 146 received from the PKI broker 106. For example, the management service 119 can change the SCEP challenge in the SCEP payload 136 to a value specified in the payload overrides 146 received from the PKI broker 106. As another example, the management service 119 can change the SCEP endpoint in the SCEP payload 136 to a value specified in the payload overrides 146 received from the PKI broker 106. In some instances, these changes can be made to the SCEP payload 136 directly. In other instances, these changes can be accomplished by creating a copy of the SCEP payload 136 that contains the payload overrides 146

Referring next to step 313, the management service 119 causes the management server 103 to send the modified SCEP payload 136 to the client device 113. For example, the management service 119 can cause the management server 103 to create a network socket configured to send data to the client device 113. The management service 119 can then make one or more calls to an application programming interface (API) provided by an operating system of the management server 103 to send the modified SCEP payload 136 across the network 116 to the client device 113. As a result, the management service 119 can relay authentication credentials to the client device 113 that were derived from a user's credentials, without having to have access to the user's credentials.

Although the sequence diagram of FIG. 2 and the flowchart of FIG. 3 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the sequence diagram can be skipped or omitted. In addition, any number of counters, state variables, warning semaphores, or messages can be added to the logical flow described herein, for purposes of enhanced utility, accounting, performance measurement, or troubleshooting aid. It is understood that all of these variations are within the scope of the present disclosure.

The individual components of the management server 103, the PKI broker 106, the certificate server 109, the client device 113, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 119, the broker service 139, and the CA 149, as well as other components described herein, can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing logic functions upon an application of one or more data signals, application specific integrated circuits (ASICs) having appropriate logic gates, programmable logic devices (for example, field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

The above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

Therefore, the following is claimed:

1. A system for relaying simple certificate enrollment protocol (SCEP) payloads using derived credentials, comprising:
a computing device comprising a processor and a memory; and
an application stored in the memory that, when executed by the processor, causes the computing device to at least:
configure a device profile corresponding to a client device, the device profile comprising a SCEP payload that comprises a first SCEP challenge;
receive an override for the SCEP payload from a broker service, the override comprising a second SCEP challenge that is based at least in part on a user account credential submitted by the client device to the broker service;
create a modified copy of the device profile comprising the override for the SCEP payload; and
send the modified copy of the device profile to the client device.

2. The system of claim 1, wherein the override received from the broker service is provided by the broker service in response to authentication of a user account with the broker service.

3. The system of claim 1, wherein the SCEP payload further comprises a SCEP endpoint.

4. The system of claim 3, wherein the SCEP endpoint further comprises the broker service.

5. The system of claim 3, wherein the SCEP endpoint comprises a certificate authority.

6. The system of claim 1, wherein the SCEP payload further comprises the user account credential.

7. The system of claim 1, wherein the SCEP payload further comprises user specific data.

8. A method for relaying simple certificate enrollment protocol (SCEP) payloads using derived credentials, comprising:
configuring a device profile corresponding to a client device, the device profile comprising a SCEP payload that comprises a first SCEP challenge;
receiving an override for the SCEP payload from a broker service, the override comprising a second SCEP challenge that is based at least in part on a user account credential submitted by the client device to the broker service;
creating a modified copy of the device profile comprising the override for the SCEP payload; and
sending the modified copy of the device profile to the client device.

9. The method of claim 8, wherein the override received from the broker service is provided by the broker service in response to authentication of a user account with the broker service.

10. The method of claim 8, wherein the SCEP payload further comprises a SCEP endpoint.

11. The method of claim 10, wherein the SCEP endpoint comprises the broker service.

12. The method of claim 10, wherein the SCEP endpoint comprises a certificate authority.

13. The method of claim 8, wherein the SCEP payload further comprises the user account credential.

14. A non-transitory computer readable medium comprising machine readable instructions for relaying simple certificate enrollment protocol (SCEP) payloads using derived credentials that, when executed by a processor of a computing device, cause the computing device to at least:
configure a device profile corresponding to a client device, the device profile comprising a SCEP payload that comprises a first SCEP challenge;
receive an override for the SCEP payload from a broker service, the override comprising a second SCEP challenge that is based at least in part on a user account credential submitted by the client device to the broker service;
create a modified copy of the device profile comprising the override for the SCEP payload; and
send the modified copy of the device profile to the client device.

15. The non-transitory computer readable medium of claim 14, wherein the override received from the broker service is provided by the broker service in response to authentication of a user account with the broker service.

16. The non-transitory computer readable medium of claim 14, wherein the SCEP payload further comprises a SCEP endpoint.

17. The non-transitory computer readable medium of claim 16, wherein the SCEP endpoint comprises the broker service.

18. The non-transitory computer readable medium of claim 16, wherein the SCEP endpoint comprises a certificate authority.

19. The non-transitory computer readable medium of claim 14, wherein the SCEP payload further comprises the user account credential.

20. The non-transitory computer readable medium of claim 14, wherein the SCEP payload further comprises user specific data.

\* \* \* \* \*